United States Patent Office 2,920,072
Patented Jan. 5, 1960

2,920,072

ANTHRAQUINONE AZO DYESTUFFS

Hans Peter Kölliker, Basel, Alfred Staub, Binningen, and Peter Hindermann, Batterie, near Basel, Switzerland, assignors to J. G. Geigy A.-G., Basel, Switzerland No Drawing. Application June 23, 1958
Serial No. 743,958

Claims priority, application Switzerland July 5, 1957

6 Claims. (Cl. 260—207)

The invention concerns new, green anthraquinone dyestuffs which are distinguished by their affinity to cellulose. It also concerns processes for the production of the new anthraquinone dyestuffs as well as the use thereof for the dyeing or printing of cellulose material and it also concerns, as industrial product, the material dyed with the aid of these dyestuffs.

It has been found that new, valuable dyestuffs of the anthraquinone series are obtained if a 4-(4'-aminophenylamino)- or a 4-(4'-aminodiphenyl-(4)-amino)-1-aminoanthraquinone compound which contains in the 2-position an acid dissociating, salt-forming group or a substituent which can be converted into such a group is acylated with an azobenzene carboxylic acid halide which contains the carbonyl halide group in the m- or preferably the p-position to the azo linkage of one benzene ring and contains an o-hydroxycarboxyl function in the other benzene ring and which in addition can contain further inert substituents usual in azo dyestuffs and then, if necessary exchanging the substituent in the 2-position in the anthraquinone radical for, or converting it into an acid salt-forming group.

Anthraquinone compounds which are used according to the present invention are, for example the 1-amino-4-(4'-aminophenylamino)-anthraquinone-2-sulphonic and -carboxylic acids. These are obtained for example from 4-bromo-1-amino-anthraquinone-2-sulphonic or -carboxylic acids and 1.4-diaminobenzenes or 1-amino-4'-acylaminobenzenes (in the latter case by saponifying the acylamino to the free amino group). Also, 1-amino-4-(4'-aminodiphenyl-(4)-amino)-anthraquinone-2-sulphonic or -carboxylic acids can be used according to the present invention which can be produced from 4-bromo-1-aminoanthraquinone-2-sulphonic or -carboxylic acids by condensation with 4.4'-diaminodiphenyls or 4-amino-4'-acylaminodiphenyls (in the latter case by saponifying the acylamino group to the free amino group). In addition to those defined, the anthraquinone radicals can also contain further substituents which are inert under the reaction conditions, for example the sulphonic acid groups for example in the 5-, 6-, 7- or 8-position of the anthraquinone radical. Also the aromatic radicals of the amino group in the 4-position in the anthraquinone radical can contain inert substituents (i.e. substituents stable under the reaction conditions). If, for example such inert substituents are phenyl radicals, they can contain low alkyl or alkoxy groups; if they are diphenyl radicals they can contain methyl or methoxy groups, these latter preferably in the 3.3'-position. Thus chiefly the sulphonic acid and carboxylic acid group are used as acid, salt-forming groups in the 2-position of the anthraquinone radical.

According to a modification of the process according to the present invention however, also those 4-(4'-aminophenylamino)- or 4-(4'-aminodiphenyl-(4)-amino)-1-aminoanthraquinone compounds can be used which, instead of the acid, salt-forming group in the 2-position of the anthraquinone radical, contain a substituent which can be exchanged for an acid, salt-forming group or can be modified into such a group in a higher step of the reaction process, for example a bromine atom which can be exchanged by means of alkali sulphites for the sulphonic acid group or a carboxylic acid ester or a cyano group which can be saponified to the carboxylic acid group.

The acylating agents used according to the present invention are obtained from azobenzene compounds which contain a carboxyl group in the m- or preferably the p-position to the azo linkage on one benzene ring and which contain an o-hydroxycarboxyl function in the other benzene ring, i.e. for example an o-hydroxycarboxylic acid grouping or an o-hydroxycarboxylic acid alkyl ester grouping, by treating such azobenzene compounds with excess thionyl chloride in the warm or by reacting with phosphoric acid chlorides. If there are two free carboxyl groups present in the starting material then it is advantageous to continue the reaction until the bis-carbonyl halide is formed. If the acid halides so produced are reacted in inert organic or organic/aqueous solution in a molecular ratio of about 1:1 with the 4-aminoaryl-amino-1-aminoanthraquinone compounds used according to the present invention, which on using sulphonated compounds are advantageously acylated in the form of aqueous solutions of the alkali metal salts, for example as solutions of the lithium, sodium, potassium or rubidium salts, then dyestuffs according to the present invention are obtained, if necessary after introduction of acid, salt-forming groups in the 2-position of the anthraquinone radical. Valuable dyestuffs are those of the general formula:

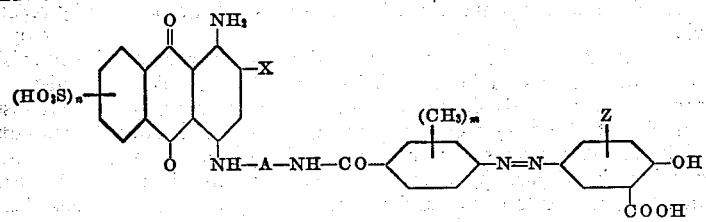

wherein A represents a member selected from the group consisting of p-phenylene and 4.4'-diphenylene and the lower alkyl, lower alkoxy and sulphonated derivatives thereof, X represents a member selected from the group consisting of —SO$_3$H and —COOH, Z represents a member selected from the group consisting of H, —CH$_3$ and Cl, and $n$ and $m$ each represents one of the numerals 0 and 1.

Particularly valuable, in particular because of their good drawing power, are the dyestuffs in which X represents a sulphonic acid group and A represents the 4.4'-diphenylene radical, and those of the formula:

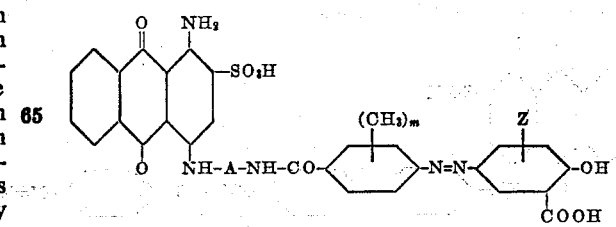

wherein A represents a member selected from the group consisting of 4.4'-diphenylene and the lower alkyl, lower alkoxy and sulphonated derivatives thereof, and m and Z have the meanings given above.

The benzoylation is performed advantageously in the presence of acid binding agents, of which examples which can be used are the alkali metal salts of low fatty acids, tertiary nitrogen bases, alkali carbonates or earth alkali oxides or hydroxides such as magnesium oxide or calcium hydroxide. Advantageosuly water soluble or water miscible liquids such as low aliphatic ketones, e.g. acetone or methylethyl ketone, amides of low fatty acids such as N.N-dimethyl formamide or low aliphatic sulphoxides or sulphones such as dimethyl sulphoxide or sulphone are used as inert organic solvents for the benzoylating agents.

It was surprising that with the preferred use of azobenzene dicarboxylic acid dihalides, good yields of monobenzoyl compounds of good purity are obtained in a practically uniform reaction.

The new dyestuffs are green powders and in the form of their alkali metal salts, e.g. their lithium, sodium, potassium or rubidium salts they generally dissolve well in hot water with a green colour. They are distinguished by good affinity to cellulose fibres, and produce very pure, neutral green cellulose dyeings of very good wet and light fastness. Also the cellulose dyeings are in particular fast to drops of water. If necessary the wet fastness properties of the new dyestuffs can be improved by an after-treatment with heavy metal salts, e.g. with copper, chromium or cobalt salts, and with basic nitrogen resins. This after-treatment only causes an unimportant alteration in the shade. Because of these properties, the new dyestuffs are suitable for the production of fast, green-dyed cellulose material of natural or synthetic origin.

Further details of the process according to the present invention can be seen from the following examples which serve to illustrate the invention. In the examples, parts are given as parts by weight where not otherwise stated, and the temperatures are in degrees centigrade. The relationship of parts by weight to parts by volume is as that of grammes to cubic centimetres.

*Example 1*

50.7 parts of the sodium salt of 1-amino-4-(4'-aminodiphenyl-(4)-amino)-anthraquinone-2-sulphonic acid are dissolved at 40–45° in a mixture of 4000 parts of water and 1000 parts by volume of acetone. After the addition of a solution of 10 parts of anhydrous potassium acetate, in a little water, 48.5 parts of the dichloride of 4-hydroxy-azobenzene-3.4'-dicarboxylic acid are sprinkled in in small portions within a short time. The reaction of the mixture is kept weakly alkaline by the continual addition slowly of a diluted sodium carbonate solution.

The sodium salt of the compound

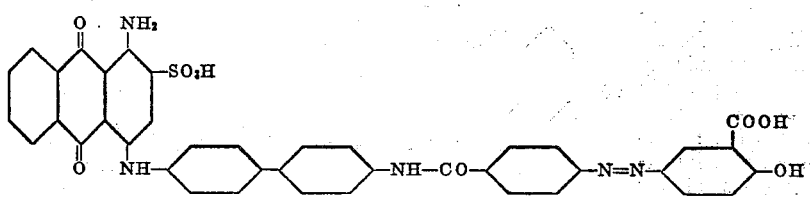

which precipitates after 24 hours is isolated by distilling off the acetone, filtering off and washing with a diluted sodium chloride solution. It is again dissolved in hot water and salted out. The dyestuff dyes cotton and regenerated cellulose fibres in pure green shades.

The cellulose dyeings have good wet and light fastness properties.

If the 50.7 parts of the sodium salt of 1-amino-4-(4'-aminodiphenyl - (4) - amino)-anthraquinone-2-sulphonic acid are replaced by 53.5 parts of the sodium salt of 1-amino - 4 - (3.3'-dimethyl-4'-aminodiphenyl-(4)-amino)-anthraquinone-2-sulphonic acid, 46.2 parts of the sodium salt of 1-amino-4-(3'-methoxy-4'-amino-phenylamino)-anthraquinone-2-sulphonic acid, 44.6 parts of the sodium salt of 1 - amino-4-(3'-methyl-4'-amino-phenylamino)-anthraquinone-2-sulphonic acid or 60.9 parts of the disodium salt of 1-amino-4-(4'-aminodiphenyl-(4)-amino)-anthraquinone-2.5- or -2.8-disulphonic acid or a mixture thereof, then similar green dyestuffs are obtained.

*Example 2*

56.7 parts of the sodium salt of the condensation product from one mol of 1-amino-4-bromo-anthraquinone-2-sulphonic acid with one mol of 3.3'-dimethoxy-4.4'-diaminophenyl are dissolved in 8000 parts of water, 15 parts of sodium bicarbonate are added and then the whole is stirred at room temperature for 48 hours with 35.5 parts of 4-hydroxy-azobenzene-3.4'-dicarboxylic acid dichloride. The reaction of the solution is kept weakly alkaline during this time by the dropwise addition of a diluted sodium carbonate solution.

On addition of sodium chloride, the dyestuff of the formula:

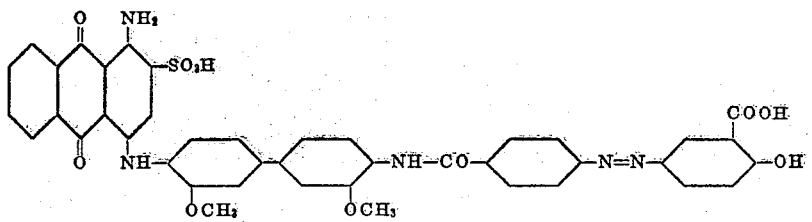

precipitates in a fine form, it is filtered off and purified by repeatedly redissolving in hot water and salting out.

It dyes cotton and regenerated cellulose fibres in very yellowish green shades which have good fastness properties.

If instead of 35.5 parts of 4-hydroxyazobenzene-3.4'-dicarboxylic acid dichloride, 36.2 parts of 4-hydroxy-2'-methyl-azobenzene-3.4'-dicarboxylic acid dichloride or 50.6 parts of 4-hydroxy-5-chloro- or -6-chloro-azobenzene-3.4'-dicarboxylic acid dichloride are used, then dyestuffs are obtained which dye cotton in very similar green shades.

*Example 3*

A solution of 38.8 parts of 4-hydroxy-2'.6-dimethyl-azobenzene-3,4'-dicarboxylic acid dichloride in 400 parts by volume of acetone is added dropwise at 0–10° while stirring well and within 15 hours to a solution of 52.3 parts of the potassium salt of 1-amino-4-(4-'aminodiphenyl-(4)-amino)-anthraquinone-2-sulphonic acid in 8000 parts of water. The reaction of the mixture is kept very weakly alkaline during the addition by the continual addition dropwise of a 10% sodium carbonate solution. On completion of the dropwise addition, the whole is stirred for 20 hours at 0–10° and then for 1 hour at 40–45°.

The precipitated dyestuff of the formula:

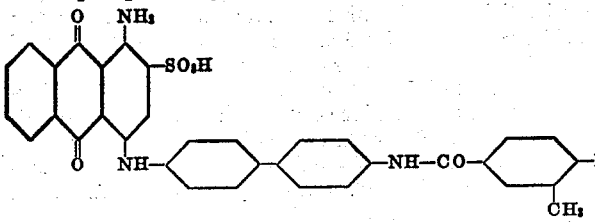

is filtered off and purified by dissolving in hot water and salting out several times with sodium chloride.

It dyes cotton and regenerated cellulose fibres in clear green shades which have good fastness properties.

If in the above example, the 38.8 parts of 4-hydroxy-2'.6-dimethyl-3.4'-dicarboxylic acid dichloride is replaced by 37.4 parts of 4-hydroxy-2'-methyl-azobenzene-3.4'-dicarboxylic acid dichloride, 42.8 parts of 4-hydroxy-6-chloro-azobenzene-3.4'-dicarboxylic acid dichloride or 4-hydroxy-5-chloro-azobenzene-3.4'-dicarboxylic acid dichloride, or if instead of 52.3 parts of the potassium salt of 1 - amino - 4-(4'-amino-diphenyl-(4)-amino)-anthraquinone-2-sulphonic acid, 55.1 parts of the potassium salt of 1 - amino - 4-(3.3'-dimethoxy-4'-amino-diphenyl-(4)-amino)-anthraquinone-2-sulphonic acid or 60.9 parts of the disodium salt of 1-amino-4-(4'-amino-diphenyl-(4)-amino)-anthraquinone-2.3'-disulphonic acid are used, then dyestuffs having very similar clear green shades are obtained.

Example 4

50.7 parts of the sodium salt of 1-amino-4-(4'-aminodiphenyl - (4) - amino) - anthraquinone - 2 - sulphonic acid are dissolved at room temperature in 5000 parts of water and, after the addition of 140 parts by volume of a 10% aqueous potassium carbonate solution, a solution of 42.1 parts of 4-hydroxy-6-methyl-azobenzene-3.4'-dicarboxylic acid dichloride in 500 parts by volume of acetone is poured in within a short time while stirring well. The reaction mixture is stirred for 24 hours at room temperature and the reaction is kept weakly alkaline during this time with aqueous potassium carbonate solution.

The dyestuff of the formula:

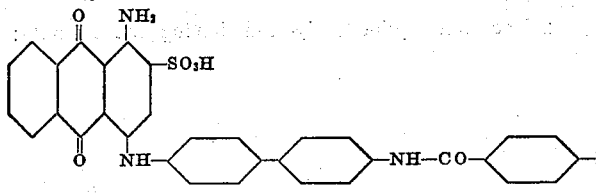

precipitates in a pure form and is isolated by filtering off. The crude product is purified by dissolving in water and salting out of the warm solution.

The dyestuff dyes cotton and regenerated cellulose fibres in fast green shades.

If in the above example the 42.1 parts of 4-hydroxy-6-methyl-azobenzene-3.4'-dicarboxylic acid dichloride are replaced by the same amount of 4-hydroxy-5-methyl-azobenzene-3.4'-dicarboxylic acid dichloride, then a green dyestuff having very similar properties is obtained.

If, instead of 50.7 parts of the sodium salt of 1-amino-4 - (4' - aminodiphenyl - (4) - amino) - anthraquinone - 2-sulphonic acid, 53.5 parts of the sodium salt of 1- amino - 4 - (3.3' - dimethyl - 4' - aminodiphenyl - (4) - amino) - anthraquinone - 2 - sulphonic acid or 60.9 parts of the disodium salt of 1-amino-4-(4'-aminodiphenyl-(4)-amino)-anthraquinone-2.3'-disulphonic acid or of the disodium salt of 1 - amino - 4 - (4' - amino - diphenyl - (4)-amino)-anthraquinone-2.5- or -2.8-disulphonic acid or of a mixture thereof are used, then similar dyestuffs are obtained which also dye cotton in clear green shades.

Example 5

43.1 parts of the sodium salt of 1-amino-4-(4'-aminophenylamino)-anthraquinone-2-sulphonic acid and 14 parts of sodium hydrogen carbonate are dissolved at room temperature in 1500 parts of water and a solution of 37.4 parts of 4-hydroxy-5-methyl-azobenzene-3.4'-dicarboxylic acid dichloride in 400 parts of acetone are added dropwise to this solution within 5 hours while stirring well. The reaction of the mixture is continuously kept very weakly alkaline by the gradual addition dropwise of a diluted sodium carbonate solution. The whole is stirred for another 20 hours at room temperature, then for 1 hour at 40–45° and the acetone is distilled off. The crude dyestuff of the formula:

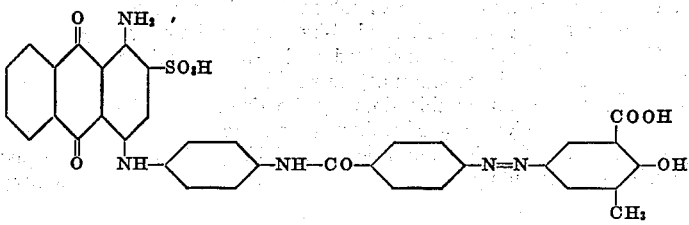

is isolated with sodium chloride and filtered off. The crude product obtained is further purified by dissolving in hot water and again salting out with sodium chloride.

The pure dyestuff dyes cotton and regenerated cellulose fibres in clear green shades which have good fastness properties.

If instead of 37.4 parts of 4-hydroxy-5-methyl-azobenzene-3.4'-dicarboxylic acid dichloride, 37.4 parts of 4-hydroxy-6-methyl-azobenzene-3.4'-dicarboxylic acid dichloride are used, or if the 43.1 parts of the sodium salt of 1 - amino - 4 - (4' - amino - phenylamino) - anthraquinone-2-sulphonic acid are replaced by 46.2 parts of the sodium salt of 1 - amino - 4 - (3' - methoxy - 4' - aminophenylamino) - anthraquinone - 2 - sulphonic acid or by 44.6 parts of the sodium salt of 1 - amino - 4 - (3' - methyl - 4' - amino - phenylamino) - anthraquinone - 2 - sulphonic acid or by 53.3 parts of the disodium salt of 1-amino - 4 - (4' - amino - phenylamino) - anthraquinone-2.3'-disulphonic acid, then dyestuffs are obtained which dye cotton in similar green shades.

Example 6

48.4 parts of 1 - amino - 2 - bromo - 4 - (4' - amino-3'.3 - dimethoxy - diphenyl - (4) - amino) - anthraquinone (which can be produced by the gradual addition of a solution of 38.1 parts of 1 - amino - 2.4 - dibromo-anthraquinone in 400 parts of chlorobenzene at 130–135° to a solution of 24.4 parts of 4.4' - diamino - 3.3' - dimethoxydiphenyl in 200 parts of chlorobenzene, the addition being made in the presence of a little copper) are dissolved in 1000 parts of dimethyl formamide. 500 parts of hot water are gradually added and then 10 parts of potassium acetate are added and, at 40–45°, the solution of 38.8 parts of 4-hydroxy-azobenzene-3.4'-dicarboxylic acid dichloride in 400 parts of dimethyl formamide is poured in within one hour while stirring well. The reaction is kept in the weakly alkaline pH range by the simultaneous dropwise addition of a diluted sodium carbonate solution. The whole is stirred for 20 hours at 40–45°, 4000 parts of water are then added whereupon the reaction product precipitates. It is filtered off by suction, washed with water, diluted sodium carbonate solution and again with water until the filtrate is colourless. The reaction product is then dried, dissolved in 200 parts of phenol, 200 parts by volume of a 16% potassium sulphite solution are added to the solution and the whole is refluxed until the dyestuff has become completely water soluble. The phenol is then removed with steam and the dyestuff is salted out, filtered off, re-precipitated from water with sodium chloride and dried. It is identical to the product obtained according to Example 2.

*Example 7*

47.1 parts of the sodium salt of 1-amino-4-(4'-aminodiphenyl - (4) - amino) - anthraquinone - 2 - carboxylic acid are dissolved in 5000 parts of water and 2000 parts by volume of acetone. After the addition of 10 parts of anhydrous potassium acetate dissolved in a little water, 48.5 parts of the dichloride of 4-hydroxy-azobenzene-3.4'-dicarboxylic acid are sprinkled in in small portions within 2 hours. The reaction of the solution is kept very weakly alkaline during this time by the dropwise addition of a diluted solution of sodium carbonate.

On addition of sodium chloride after 25 hours, the dyestuff of the formula

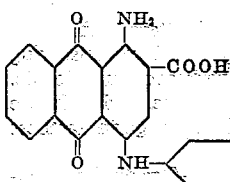

precipitates. It is filtered off and purified by re-dissolving in hot water and salting out several times. It dyes cotton and regenerated cellulose fibres in clear green shades which have good fastness properties.

If the 47.1 parts of the sodium salt of 1-amino-4-(4'-aminodiphenyl-(4)-amino)-anthraquinone - 2 - carboxylic acid are replaced by 39.5 parts of the sodium salt of 1-amino-4-(4'-aminophenylamino) - anthraquinone-2-carboxylic acid, 49.7 parts of the disodium salt of 1-amino-4-(4'-aminophenylamino)-anthraquinone - 2 - carboxy-3'-sulphonic acid, 57.3 parts of the disodium salt of 1-amino-4-(4'-aminodiphenyl-(4)-amino)-anthraquinone - 2 - carboxy-3'-sulphonic acid, then very similar green cotton dyestuffs are obtained.

*Example 8*

100 parts of cotton fabric are entered at 40–45° into a dyebath which contains 2 parts of the dyestuff according to Example 1, 40 parts of Glauber's salt and 10 parts of sodium carbonate in 2500 parts of water. The temperature is gradually increased to 90°, dyeing is performed for 1 hour at this temperature and then the dyed goods are rinsed.

A fast clear, green cotton dyeing is obtained.

What we claim is:

1. The anthraquinone dyestuff having the general formula:

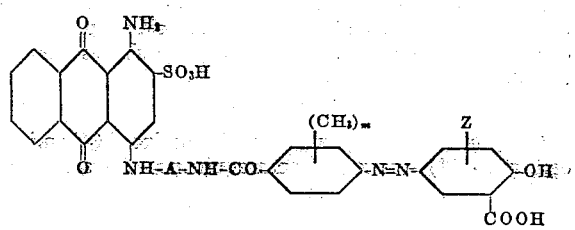

wherein A represents a member selected from the group consisting of 4.4'-diphenylene and the lower alkyl, lower alkoxy and sulphonated derivatives thereof, Z represents a member selected from the group consisting of H, —CH₃ and Cl, and m represents one of the numerals 0 and 1.

2. The anthraquinone dyestuff having the formula:

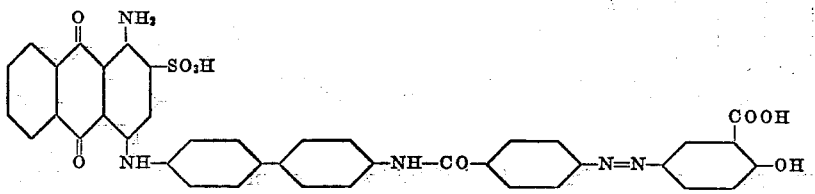

3. The anthraquinone dyestuff having the formula:

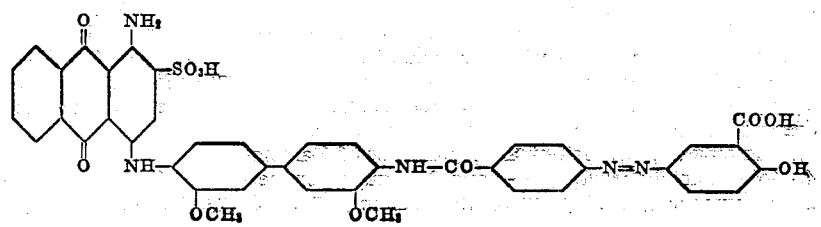

4. The anthraquinone dyestuff having the formula:
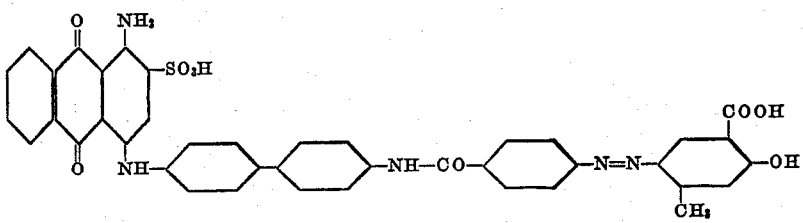
5. The anthraquinone dyestuff having the formula:
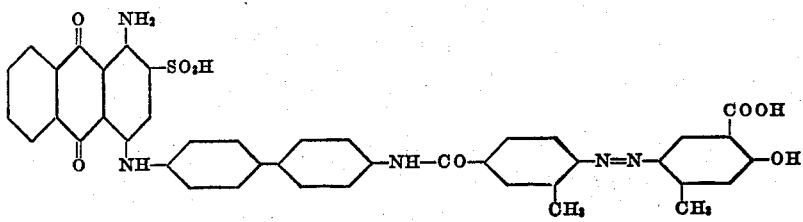
6. The anthraquinone dyestuff having the formula:
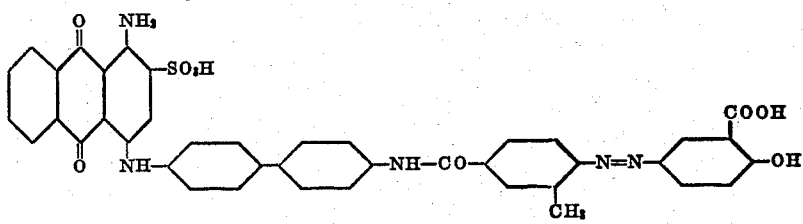
References Cited in the file of this patent
UNITED STATES PATENTS
| | | |
|---|---|---|
| 2,154,981 | Gubler et al. | Apr. 18, 1939 |
| 2,199,048 | Graenacher et al. | Apr. 30, 1940 |
| 2,741,657 | Schmid et al. | Apr. 10, 1956 |